United States Patent
Janssen

(10) Patent No.: US 9,087,383 B2
(45) Date of Patent: Jul. 21, 2015

(54) METHOD FOR DYNAMIC BACKGROUND REDUCTION

(71) Applicant: OCÉ-TECHNOLOGIES B.V., Venlo (NL)

(72) Inventor: Johannes H. M. Janssen, Velden (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 1 day.

(21) Appl. No.: 14/295,077

(22) Filed: Jun. 3, 2014

(65) Prior Publication Data

US 2014/0362421 A1    Dec. 11, 2014

(30) Foreign Application Priority Data

Jun. 5, 2013 (EP) .................................... 13170581

(51) Int. Cl.
  *G06T 5/00* (2006.01)
  *H04N 1/407* (2006.01)
  *H04N 1/40* (2006.01)

(52) U.S. Cl.
  CPC *G06T 5/008* (2013.01); *H04N 1/40* (2013.01); *H04N 1/4072* (2013.01)

(58) Field of Classification Search
  CPC . H04N 1/00002; H04N 1/58; H04N 1/00063; H04N 1/00045; H04N 1/409; H04N 1/4097; H04N 1/4076; H04N 1/40056; H04N 1/4072; G06T 5/001

USPC ................ 358/3.26, 463, 464, 465, 466, 451; 382/272, 275, 298
See application file for complete search history.

(56) References Cited

U.S. PATENT DOCUMENTS

| | | | |
|---|---|---|---|
| 6,222,642 B1* | 4/2001 | Farrell et al. ................... | 358/1.9 |
| 6,813,389 B1* | 11/2004 | Gindele et al. ................ | 382/274 |
| 7,515,748 B2 | 4/2009 | Nystrom et al. | |
| 7,734,089 B2* | 6/2010 | Zhang et al. .................. | 382/181 |
| 8,559,752 B2* | 10/2013 | Janssen ........................ | 382/275 |
| 2002/0154322 A1 | 10/2002 | Tretter | |
| 2009/0323132 A1 | 12/2009 | Yano et al. | |

OTHER PUBLICATIONS

Pratt W K: "Digital Image Processing"; Jan. 1, 1978; XP002530178; pp. 307-319.

* cited by examiner

*Primary Examiner* — Cheukfan Lee
(74) *Attorney, Agent, or Firm* — Birch, Stewart, Kolasch & Birch, LLP

(57) ABSTRACT

A method is provided for reducing a background in a raster image as generated from capturing a hardcopy original. The background indicates a deviation between a lightness value of a subset of pixels in the raster image and a maximum lightness value of raster image input values, contrasting with dark information in the image. Two areas around the target pixel are defined, one area being substantially smaller than the other. An average of a lightness value of the pixels in each of the two areas are combined to obtain a background parameter, indicating a locally varying background in the raster image. A target pixel lightness value is scaled using the background parameter and the maximum lightness value.

10 Claims, 2 Drawing Sheets

METHOD FOR DYNAMIC BACKGROUND REDUCTION

CROSS-REFERENCE TO RELATED APPLICATIONS

This application claims priority under 35 U.S.C. §119(a) to Application No. 13170581.6, filed in Europe on Jun. 5, 2013, the entire contents of which is hereby incorporated by reference into the present application.

BACKGROUND OF THE INVENTION

1. Field of the Invention

The present invention relates to a method for reducing a background in a raster image, the raster image comprising pixels having a lightness value, the background indicating a deviation between a lightness value of a subset of pixels in the raster image and a maximum lightness value of raster image input values.

The present invention further relates to a print system, comprising a scanner for converting a hardcopy original into a digital raster image, a programmable electronic circuit for processing the digital raster image into an output raster image, and a print engine for marking a receiving medium in accordance with the output raster image.

2. Description of Background Art

Digital image processing methods have proliferated since their inception a number of decades ago. Depending on the application and the available resources in terms of processing capacity, time and memory, a selection of an appropriate algorithm may be made. These methods have profoundly affected the field of copying, wherein, in its traditional form, light sensitive materials were exposed to light stemming from an illuminated original hardcopy. In its present-day form, an original hardcopy is converted into a raster image, comprising pixels with digital values that indicate a local property of the image, such as color, optical density, or lightness. Digital image enhancement methods are applied to improve some of the image characteristics, whether or not in dependence of an original type, and user preferences. Subsequently, the enhanced digital raster image is converted to print data that are used in a print engine for marking a receiving medium, such as paper or any other substantially flat material that is suitable for receiving an image.

Many hardcopy images comprise dark information on a light background. Such images include text information or line drawings for engineering purposes on white paper. Very old hardcopy originals sometimes have light information on dark background, which is readily inverted once the images are brought into the digital domain. Therefore, in this description, information will be considered to be dark relative to a light background. Depending on the quality and age of the hardcopy, the light background may have a varying lightness. Furthermore, a utilized hardcopy may contain stains or locally darkened areas, obfuscating the information that was supposed to contrast with the background. Especially light sensitive materials, such as used in diazo whiteprint processes, may have degraded in this way. In extreme cases, the background may be locally darker than the information on other parts of the hardcopy.

In the process of converting an original hardcopy into a digital raster image, e.g. by application of a scanner, either of a flatbed type or a transport type, a design choice is made for a range of the digital lightness values. Depending on the lightness values that are obtained for a specific original, the pixel values are scaled to a proper, predetermined output range, as indicated e.g. by W. K. Pratt, *Digital Image processing*, John Wiley & Sons, 1978, p. 308, which leads to a discrete image contrast enhancement. However, a representative value for a maximum occurring value in the specific original is required for the indicated scaling, that converts this maximum occurring value to a maximum value of the predetermined output range. This maximum occurring value, or background parameter, is often obtained from an analysis of a histogram of occurring digital values for pixels of the image, or related lightness values. In this kind of algorithm, one maximum occurring value, a global maximum occurring value, is used for scaling all pixels of the image. Such a histogram analysis can only be made if all pixel values are available, which is after the capturing of the complete image is finished.

In some capturing processes, not all pixel values of the full original are available. This may be the case in a capturing process of large technical documents, such as architectural and structural drawings, using a transport type scanner. If the processing already starts, before the last part of the original is captured, a firstly scanned part of the original may be regarded as representative for the whole image. As a consequence, depending on the original, a resulting digital raster image may depend on the way the original is introduced in the capturing device. A moving average method, which adapts a dynamic background parameter to pixel values in new scan-lines, alleviates this dependency.

Images of originals having a locally varying background, may be processed in portions, or tiles. Around every single pixel, a tile comprising a number of pixels is defined. A histogram of values of pixels within the tile is made in order to derive a local maximum occurring value, or a local background parameter, which is then used to scale the single pixel within the tile. This tile, or window, comprises a sufficient number of pixels to compose a reliable histogram. This kind of moving window method for processing pixels is commonly applied for locally adapting an image characteristic. An example is the contrast enhancement method in U.S. Pat. No. 7,515,748. However, these methods are quite computationally intensive, which means they are not very suitable for productively processing large raster images from technical documents with limited resources.

SUMMARY OF THE INVENTION

In view of the above, a problem exists in reducing a background in raster images with limited computational resources. An object of the present invention is to provide a method that overcomes this problem.

According to the present invention, the abovementioned object is achieved by a method comprising the steps of selecting a target pixel in the raster image, determining a first average lightness value for a first number of pixels around the target pixel, determining a second average lightness value for a second number of pixels around the target pixel, selecting a minimum of the first and second average lightness values as a background parameter, scaling the lightness value of the target pixel using said background parameter to the maximum lightness value of a predetermined output range, thereby obtaining a scaled lightness value of the target pixel, and generating an output raster image using the scaled lightness value of the target pixel, wherein said first number of pixels around the target pixel is substantially smaller than said second number of pixels around the target pixel.

The determination of an average value of a number of pixels around a target pixel does not require a lot of computational effort. The application of two areas with a substantially different number of pixels enables a distinction between a representative lightness value for a narrow surrounding of a target pixel and a representative lightness value for a wide surrounding of a target pixel. The wide surrounding value, corresponding to the second average lightness value, is commonly strongly influenced by background pixels, since the number of information pixels is generally smaller than the number of background pixels and the corresponding size of the original area is sufficiently large to include a large number of background pixels. The wide surrounding value changes only slowly from pixel to pixel, since a large number of pixel values contributing to the wide surrounding value are the same. Scaling of a target pixel with the wide surrounding value only as a background parameter leads to a moderate reduction of background.

The narrow surrounding value, corresponding to the first average lightness value, represents a background value that changes more quickly from pixel to pixel than the wide surrounding value. Using the narrow surrounding value to scale a dark target pixel value in a surrounding of dark pixels leads to an output pixel value with a high lightness. This is very effective for reducing the background near transitions between relatively light and dark pixels. A combination of the wide and narrow surrounding value is capable of reducing the background for originals that comprise dark image elements of limited size. If the dark image elements become larger, the background value for pixels within the interior of the image element gets closer to the pixel value, thus scaling the target pixel value to a high lightness. Still, for many applications, the background is effectively reduced with little computational effort by using a minimum of the two surrounding values.

In a further embodiment, the second number of pixels is 16 to 256 times larger than the first number of pixels. The ratio between the size of the two surrounding areas, as expressed by the ratio of the number of pixels for averaging, determines the dynamics between the moderate reduction of the second, wide average value and the sharp reduction of the first, narrow average value. Experiments have indicated the proposed range.

In a further embodiment, a third average lightness value is derived from a maximum of the first average lightness value and a predetermined fraction of the second average lightness value and the step of selecting a minimum is carried out on the second and third average lightness values. This improves the behavior of the method for originals with larger image elements, which are dark relative to a background. This predetermined fraction is in the range of 0.7 to 0.9.

In a further embodiment, the first and second average lightness values are determined for the respective number of pixels after performing a morphological operation on the pixels that erodes pixels having a low lightness value. Morphological operations apply a structuring element to work on a set of pixels, whereby a border of a pixel group is eroded or dilated. After an erosion operation, the average lightness value for both the narrow and the wide surrounding value of a target pixel is more representative of a background value, since small groups of dark pixels are eroded and contribute less to the average value. The number of pixels in the structuring element is characteristically 20 to 200 times smaller than the first number of pixels. Experimentally, this range has been found appropriate for obtaining a representative background value.

In a further embodiment, the morphological operation involves a first operation that erodes pixels with a low lightness value, a low pass filter that reduces large fluctuations of the lightness value and a second operation that dilates pixels with a low lightness value. At the cost of some extra processing time, this composite operation on the two surroundings of the target pixel further improves the suitability of resulting average values for reducing the background in the image.

In a specific embodiment, the second number of pixels corresponds to all pixels within a predetermined physical distance, this distance being in the range of 5 to 10 mm of the target pixel. In general, graphical elements in a raster image with a background that is to be reduced, do not comprise dark areas larger than about 10 to 20 mm. Therefore, in this embodiment, the second number of pixels, which are used for the wide surrounding value, comprise sufficient background pixels to provide a reliable estimate for a background parameter. For a raster image of 600 pixels per inch, the first number of pixels amounts to 1000 to 2000 pixels around the target pixel and the second number of pixels amounts to 50,000 to 200,000 pixels, whereas for a raster image of 300 pixels per inch, the first number of pixels is 250 to 500 pixels and the second number of pixels is 12,000 to 50,000.

The present invention may also be embodied in a print system, comprising a scanner for converting a hardcopy original into a digital raster image, a programmable electronic circuit for processing the digital raster image into an output raster image, and a print engine for marking a receiving medium in accordance with the output raster image, wherein the programmable electronic circuit is configured to execute the method according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
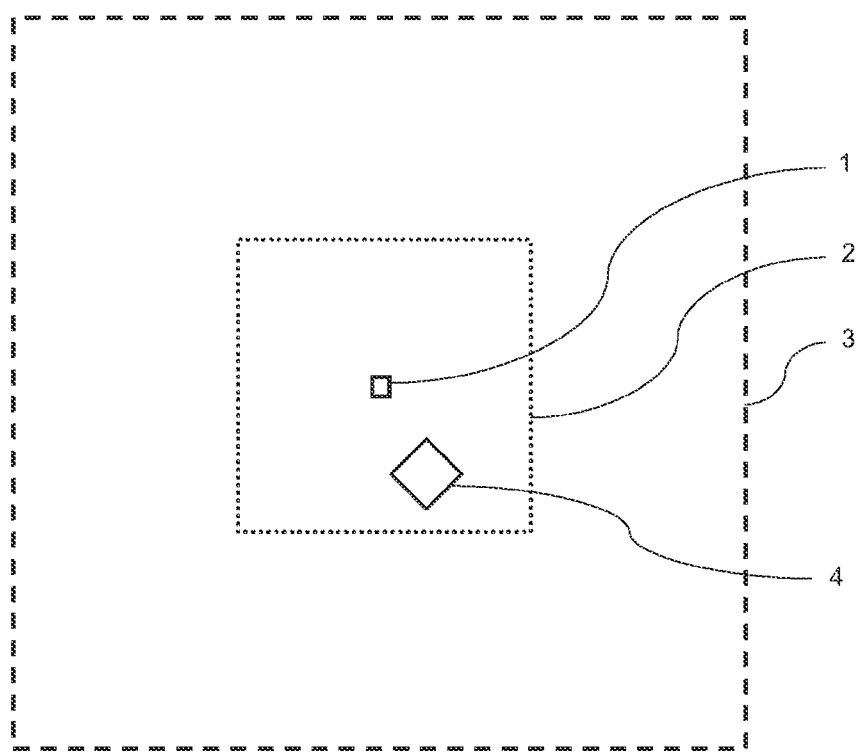
FIG. 1 illustrates a pixel of a raster image in its surroundings.

The present invention will now be described with reference to the accompanying drawings, wherein the same or similar elements are identified with the same reference characters throughout the several views.

In FIG. 1, a target pixel 1 is shown in a pre-defined narrow surrounding 2 and a pre-defined wide surrounding 3. The narrow surrounding 2 comprises 40 times 40 pixels, whereas the wide surrounding 3 comprises 320 times 320 pixels and is therefore substantially larger than the narrow surrounding 2. For images comprising 600 pixels per inch, these numbers of pixels have been found to be effective for reducing a background in a raster image. For images of 300 pixels per inch, the respective numbers of pixels are 20 and 160 pixels. For pixels close to the edge of an image, where a pre-defined surrounding extends outside the image, the pixels on the border of the image are included multiple times, so that the number of pixels in the surrounding remains constant. A lightness value for each pixel is used to derive an average lightness value for both surroundings. In some embodiments, the structuring element 4, having the shape of a square, rotated by 45° relative to the direction of the pixel lines, is used in a morphological operation on both sets of pixels. The diagonal of the structuring element is in this case 8 pixels, but may be varied to adapt the method. An erosion operation as a morphological operation determines for each pixel a new lightness value corresponding to a maximum lightness value of pixels within the structuring element around the original pixel. The erosion operation is used to eliminate noisy dark pixels that otherwise influence the background parameter. The morphological dilation operation has the opposite effect by assigning a minimum lightness value of pixels within the structuring element around each pixel in the image. Because of the large number of pixels involved in the various operations, the background parameter calculation may apply a reduced version of the image.

Figure 2:
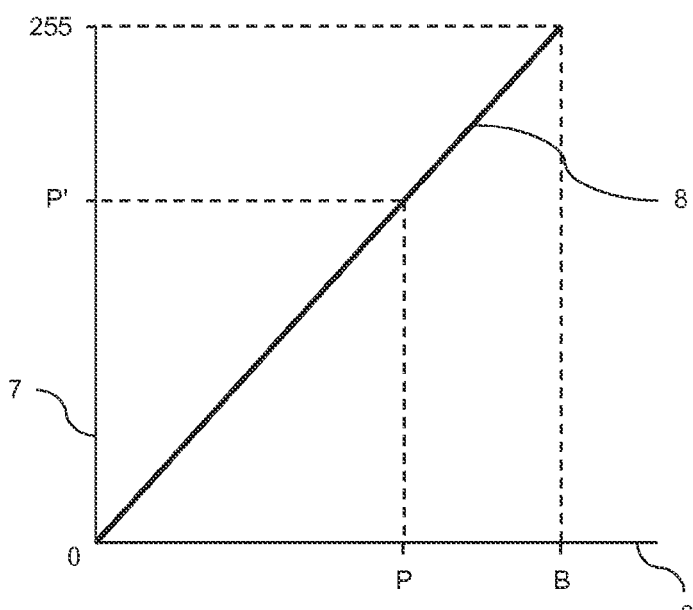
FIG. 2 is a relation between input and output pixel values in a scaling operation.

FIG. 2 shows a graph for the transformation of a target pixel value of the raster image. On a horizontal axis 6, a pixel input value is shown, and on a vertical axis 7, a pixel output value is shown. Line 8 indicates a relation between the two, according to a familiar scaling algorithm. The value B indicates a background parameter as derived by the method according to the present invention. This value is scaled to a maximum lightness value in an output range, which is in this case 255, since the output value comprises 8 bits. An input pixel value P is thus transformed to an output pixel value P' according to the relation:

$$P' = P*255/B \qquad (1)$$

In parts of the image with a dark background, the value B will be low and pixel values close to B will be transformed to output values close to 255, thereby reducing the background. Pixel values close to 0 will remain close to 0. In parts of the image with a light background, B will already be close to a maximum lightness value and little change will occur for input pixel values. Thus, an adaptive background reduction takes place. The value of pixels representing information depends on the background. The scaling operation maintains a low value relative to the background for these pixels.

Figure 3:
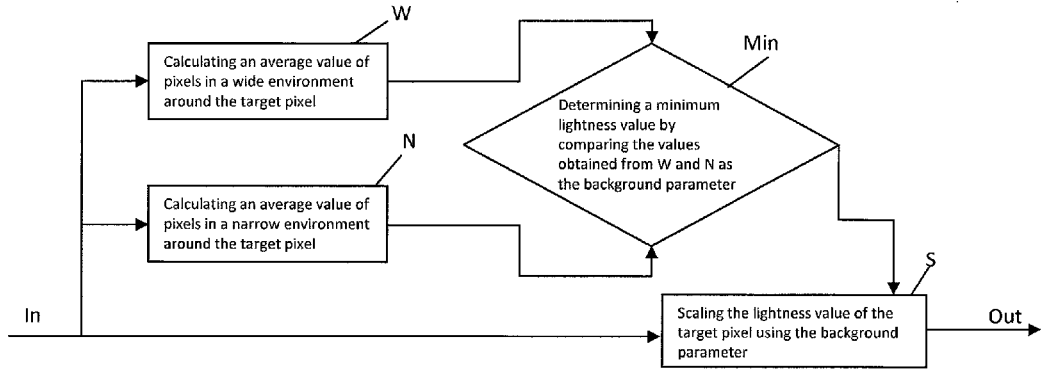
FIG. 3 is a diagram of the basic steps of the method according to the present invention.

FIG. 3 is a diagram of the basic steps for performing the method according to the present invention. No buffer memory that is involved for calculating average pixel values is shown. A stream of pixel input lightness values enters at the side "in." These input values are directed to a module W for calculating an average value of pixels in a wide environment around a target pixel, into a module N for calculating an average value of pixels in a narrow environment around the target pixel and into a module S for scaling the input target pixel, as indicated in FIG. 2. The module "min" determines the minimum lightness value as obtained from modules W and N. This minimum value is the background parameter that is used by the module S. At the side "out," a scaled output target pixel is produced that may be used in an output raster image that is printed in a printer. However, this basic embodiment is only applicable to original images having small information elements on a strongly varying background.

Figure 4:
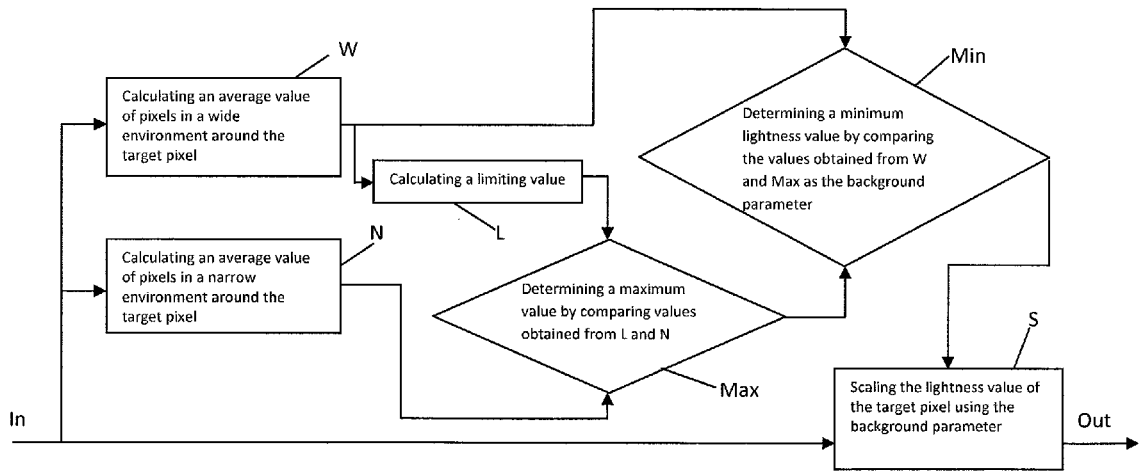
FIG. 4 is a diagram of the steps in a more sophisticated version of the method according to the present invention.

FIG. 4 is a diagram of a more sophisticated method to derive the background parameter B from a stream of input pixels. Again, at the side "in," input target pixel lightness values enter the algorithm. The modules W, N, and S have the same function as in FIG. 3. Module W outputs its average value to the module L for calculating a limiting value and to the module "min." Module N outputs its average value to the module "max," where the maximum value of the limiting value and the narrow average value is determined. This value is compared to the wide average value in the module "min," resulting in a background parameter that is input for the module S. In the same way as in FIG. 3, a scaled output target pixel is produced. Many variations in this algorithm are possible, e.g. by adding small constant values to the average values, but the main feature is the application of two environments for calculating two average values and the limitation of one value by the other. The application of morphological operations may be part of the modules N and W.

Figure 5:
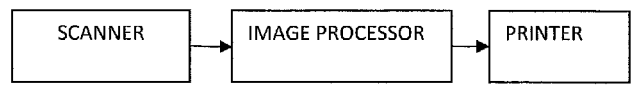
FIG. 5 is a diagram of a print system that comprises the method according to the present invention.

The methods shown in FIG. 3 and FIG. 4 are readily applied in a print system as shown in FIG. 5. It comprises a scanner for converting a hardcopy original to a digital raster image. This conversion process is often a line-by-line process. As soon as the first lines are converted, they may be sent to the image processor where they are converted into data suitable to be printed. This image processor comprises a programmable electronic circuit for processing the incoming lines of the digital raster image into lines of an output raster image according to the present invention. As soon as the first lines are processed, they are sent to the printer for marking an output medium according to the output raster image. Therefore, this system is configured to start marking an output medium during the conversion of a hardcopy original to a digital image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reducing a background in a raster image, the raster image comprising pixels having a lightness value, the background indicating a deviation between a lightness value of a subset of pixels in the raster image and a maximum lightness value of raster image input values, the method comprising the steps of:
   selecting a target pixel in the raster image;
   determining a first average lightness value for a first number of pixels around the target pixel;
   determining a second average lightness value for a second number of pixels around the target pixel;
   selecting a minimum of the first and second average lightness values as a background parameter;
   scaling the lightness value of the target pixel using said background parameter to the maximum lightness value of a predetermined output range, thereby obtaining a scaled lightness value of the target pixel; and
   generating an output raster image using the scaled lightness value of the target pixel,
   wherein said first number of pixels around the target pixel is substantially smaller than said second number of pixels around the target pixel.

2. The method according to claim 1, wherein the second number of pixels is 16 to 256 times larger than the first number of pixels.

3. The method according to claim 1, wherein a third average lightness value is derived from a maximum of the first average lightness value and a predetermined fraction of the second average lightness value and the step of selecting a minimum is carried out on the second and third average lightness values.

4. The method according to claim 3, wherein said predetermined fraction is 0.7 to 0.9.

5. The method according to claim 1, wherein the first and second average lightness values are determined for the respective number of pixels after performing a morphological operation on the pixels that erodes pixels having a low lightness value.

6. The method according to claim 5, wherein the morphological operation uses a structuring element that involves a number of pixels that is 20 to 200 times smaller than the first number of pixels.

7. The method according to claim 5, wherein the morphological operation involves a first operation that erodes pixels with a low lightness value, a low pass filter that reduces large fluctuations of the lightness value and a second operation that dilates pixels with a low lightness value.

8. The method according to claim 1, wherein the first number of pixels amounts to 1000 to 2000 pixels around the target pixel for a raster image of 600 pixels per inch.

9. The method according to claim 1, wherein the second number of pixels corresponds to all pixels within a predetermined physical distance, this distance being in the range of 5 to 10 mm of the target pixel.

10. A print system, comprising:
a scanner for converting a hardcopy original into a digital raster image;
a programmable electronic circuit for processing the digital raster image into an output raster image; and
a print engine for marking a receiving medium in accordance with the output raster image,
wherein the programmable electronic circuit is configured to execute the method according to claim 1.

* * * * *